US010814339B2

(12) United States Patent
Davis (10) Patent No.: US 10,814,339 B2
(45) Date of Patent: Oct. 27, 2020

(54) WEIGHTED MEDIAN METHOD FOR PST CONTROL SIGNAL DETERMINATION

(71) Applicant: CiDRA Corporate Services LLC, Wallingford, CT (US)

(72) Inventor: Michael A. Davis, Glastonbury, CT (US)

(73) Assignee: CIDRA CORPORATE SERVICES, INC., Wallingford, CT (US)

( * ) Notice: Subject to any disclaimer, the term of this patent is extended or adjusted under 35 U.S.C. 154(b) by 42 days.

(21) Appl. No.: 16/334,543

(22) PCT Filed: Sep. 19, 2017

(86) PCT No.: PCT/US2017/052196
§ 371 (c)(1),
(2) Date: Mar. 19, 2019

(87) PCT Pub. No.: WO2018/057495
PCT Pub. Date: Mar. 29, 2018

(65) Prior Publication Data
US 2019/0308204 A1 Oct. 10, 2019

Related U.S. Application Data

(60) Provisional application No. 62/397,195, filed on Sep. 20, 2016.

(51) Int. Cl.
*B04C 11/00* (2006.01)
*E21B 43/29* (2006.01)
(Continued)

(52) U.S. Cl.
CPC ............ *B04C 11/00* (2013.01); *D21G 9/0018* (2013.01); *E21B 43/29* (2013.01); *E21B 43/34* (2013.01);
(Continued)

(58) Field of Classification Search
None
See application file for complete search history.

(56) References Cited

U.S. PATENT DOCUMENTS

| | | |
|---|---|---|
| 5,132,024 A | 7/1992 | Hulbert |
| 7,708,146 B2 | 5/2010 | Kruyer |

(Continued)

FOREIGN PATENT DOCUMENTS

WO 2016127033 A2 8/2016

OTHER PUBLICATIONS

Russell, et al., "Optimization of hydrocyclone classification by on-line detection of coarse material in the overflow stream," 16th IFAC Symposium on Automation in Mining, Mineral and Metal Processing, Aug. 25-28, 2013, printed out on Dec. 1, 2017. (5 pages) http://www.sciencedirect.com/science/article/pii/S147466701631322.

*Primary Examiner* — Krishnan S Menon
(74) *Attorney, Agent, or Firm* — Ware, Fressola, Maguire & Barber LLP (57) ABSTRACT

A controller for controlling a slurry flowing from incoming piping and entering hydrocyclones arranged in a battery configuration, featuring a signal processor that receives signaling containing information about respective individual cyclone control signaling x(i) for each individual cyclone being evaluated and controlled, median control signaling x̃ of all of the respective individual cyclone control signaling x(i), a scale factor $A_f$ and a number N of the individual cyclones being evaluated and controlled; and determine/ provides primary control signaling C containing information to control the slurry flowing from the incoming piping and entering the hydrocyclones arranged in the battery configuration by taking the median control signaling x̃ and adding a correction factor, where the correction factor is determined by taking a sum of a respective difference of each of the (Continued)

respective individual cyclone control signaling x(i) and the median control signaling x̃, applying the scaling factor $A_i$ to each respective difference, and normalizing the sum by the number N of the individual cyclones being evaluated and controlled, based upon the signaling received.

34 Claims, 5 Drawing Sheets

(51) Int. Cl.
*E21B 43/34* (2006.01)
*G01N 15/02* (2006.01)
*G06F 17/18* (2006.01)
*D21G 9/00* (2006.01)
*G16Z 99/00* (2019.01)
*B01D 21/26* (2006.01)
*G01N 15/00* (2006.01)
*B01D 17/00* (2006.01)

(52) U.S. Cl.
CPC ............. *G01N 15/02* (2013.01); *G06F 17/18* (2013.01); *G16Z 99/00* (2019.02); *B01D 17/00* (2013.01); *B01D 21/267* (2013.01); *G01N 2015/0053* (2013.01); *G01N 2015/0288* (2013.01)

(56) References Cited

U.S. PATENT DOCUMENTS

| | | |
|---|---|---|
| 2012/0209550 A1 | 8/2012 | Van Der Spek et al. |
| 2015/0122037 A1 | 5/2015 | Obaia et al. |
| 2015/0362418 A1 | 12/2015 | Newton et al. |
| 2016/0207050 A1 | 7/2016 | Van Der Spek et al. |

A controller 10 for controlling a slurry flowing from an incoming piping 32 (Fig. 6) and entering hydrocyclones 34 arranged in a battery configuration A signal processor 12 configured at least to:

receive signaling containing information about respective individual cyclone control signaling x(i) for each individual cyclone being evaluated and controlled, median control signaling $\tilde{x}$ of all of the respective individual cyclone control signaling x, a scale factor $A_i$ and a number N of the individual cyclones being evaluated and controlled;

determine primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling $x_i$ and the median control signaling $\tilde{x}$, applying the scaling factor $A_i$ to each respective difference, and normalizing the sum by the number N of the individual cyclones being evaluated and controlled, based upon the signaling received; and/or provide the primary control signaling C as control signaling to control the flow rate and pressure of the slurry flowing from the incoming piping and entering the hydrocyclones e.g., using a flow rate and pressure regulator 50 (Fig. 5).

Other signal processor circuits or components 14 that do not form part of the underlying invention, e.g., including input/output modules, one or more memory modules, data, address and control busing architecture, etc.

Figure 3: The Controller 10

20

20a: Receiving, with a signal processor 12, signaling containing information about respective individual cyclone control signaling x(i) for each individual cyclone being evaluated and controlled, median control signaling $\tilde{x}$ of all of the respective individual cyclone control signaling x, a scale factor $A_i$ and a number N of the individual cyclones being evaluated and controlled 20b: Determining, with the signal processor 12, primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling $x_i$ and the median control signaling $\tilde{x}$, applying the scaling factor $A_i$ to each respective difference, and normalizing the sum by the number N of the individual cyclones being evaluated and controlled, based upon the signaling received.

20c: Providing, with the signal processor 12, the primary control signaling C to control the flow rate and pressure of the slurry flowing from incoming piping and entering hydrocyclones, e.g., using a flow rate and pressure regulator 50

Figure 4: The Basic Method Having a Flowchart 20

Figure 5: The Particle Size Tracking (PST) System 30

WEIGHTED MEDIAN METHOD FOR PST CONTROL SIGNAL DETERMINATION

CROSS-REFERENCE TO RELATED APPLICATIONS

This application corresponds to international patent application serial no. PCT/US2017/052196, filed 19 Sep. 2017, which claims benefit to provisional patent application Ser. No. 62/397,195, filed 20 Sep. 2016, which is incorporated by reference in their entirety.

OTHER RELATED APPLICATIONS

This application is related to PCT patent application serial no. PCT/US2016/0167721, filed 5 Feb. 2016, which claims benefit to provisional patent application Ser. No. 62/112,433, filed 5 Feb. 2015, which are both incorporated by reference in their entirety.

This application is related to PCT patent application serial no. PCT/US2016/015334, filed 28 Jan. 2016, which claims benefit to provisional patent application Ser. No. 62/108,689, filed 25 Jan. 2015, and which corresponds to U.S. patent application Ser. No. 15/084,420, filed 28 Feb. 2013, which are all incorporated by reference in their entirety.

This application is related to PCT patent application serial no. PCT/US2014/52628, filed 26 Aug. 2014, which claims benefit to provisional patent application Ser. No. 61/869,901, filed 26 Aug. 2013, and which corresponds to U.S. patent application Ser. No. 14/914,048, filed 24 Feb. 2016, which are all incorporated by reference in their entirety.

This application is related to PCT patent application serial no. PCT/US2014/012510, filed 22 Jan. 2014, which claims benefit to provisional patent application Ser. No. 61/755,305, filed 22 Jan. 2013, and which corresponds to U.S. patent application Ser. No. 14/762,223, filed 21 Jul. 2015, which are all incorporated by reference in their entirety.

This application is related to PCT patent application serial no. PCT/US2011/050500, filed 6 Sep. 2011, which claims benefit to provisional patent application Ser. No. 61/379,899, filed 3 Sep. 2010, and which corresponds to U.S. patent application Ser. No. 13/820,033, filed 28 Feb. 2013, which are all incorporated by reference in their entirety.

This application is related to PCT/US2010/45178, filed 11 Aug. 2010, which claims benefit to provisional patent application Ser. No. 61/232,875, filed 11 Aug. 2009; Ser. No. 61/400,819, filed 2 Aug. 2010; and Ser. No. 61/370,154, filed 3 Aug. 2010, and which corresponds to patent application Ser. No. 13/389,546, filed 24 Apr. 2012, which are all incorporated by reference in their entirety.

This application is related to PCT/US10/38281, filed 11 Jun. 2010, which claims benefit to provisional patent application Ser. No. 61/186,502, 12 Jun. 2009, and which corresponds to U.S. patent application Ser. No. 13/377,083, filed 21 Feb. 2012, which are all incorporated by reference in their entirety.

This application is also related to PCT/US2009/043438, filed 11 May 2009, which claims benefit to provisional patent application Ser. Nos. 61/051,775, 61/051,791, and 61/051,803, all filed 9 May 2008, and which corresponds to patent application Ser. No. 12/991,636, filed 1 Feb. 2011, which are all incorporated by reference in their entirety.

The aforementioned applications were all assigned to the assignee of the present application, which builds on this family of technology.

BACKGROUND OF THE INVENTION

1. Field of Invention

This invention relates to a technique for the tracking particle size of a slurry; and more particularly, to a controller for the tracking particle size of a slurry that is passing through a pipe in a hydrocyclone battery in a mineral extraction processing system, including extracting a mineral from ore, and providing control signaling for operating the hydrocyclone battery based upon the same.

2. Description of Related Art

In the prior art, a Particle Size Tracking (PST) system, e.g., developed by the assignee of the present invention, is able to give a particle size indication of the slurry that is passing through a pipe. This PST system can be implemented in a variety of locations, however, one important location is on the overflow pipe of hydrocyclones. Typically, hydrocyclones are arranged in a battery configuration, where a battery consists of a number of hydrocyclones that are fed by a single incoming pipe. The hydrocyclones separate the incoming slurry by particle size with the desired particles flowing out the overflow pipe. The assignee's PST system can then provides an indication of the particle size being passed by each individual hydrocyclone in the battery. Typically, control of the slurry entering the hydrocyclones can be accomplished on a battery basis, i.e. the flow rate and pressure of the incoming pipe can be controlled but there is limited control of the individual hydrocyclones aside from a simple on/off valve. Therefore, to act on the information that the PST system provides, the individual signals from each hydrocyclones' PST system must be combined into a single control signal. There are a variety of ways to do this that have been previously discussed, including taking the average or possibly the median of the signals. However, there are some drawbacks to these known methods: the average will too heavily weight an outlier hydrocyclone and possibly cause a control loop to over compensate and get into a run-away condition, while the median signal totally ignores the outlier hydrocyclones and will potentially provide a very noisily control signal.

In view of this, there is a need for a better way both for tracking particle size of a slurry, e.g., that is passing through a pipe in a hydrocyclone battery in a mineral extraction processing system, including extracting a mineral from ore, and for providing control signaling for operating the hydrocyclone battery based upon the same.

SUMMARY OF THE INVENTION

The Present Invention

The present invention provides a new technique that builds upon these two known methods set forth above, e.g., based upon using a weighted median approach for PST control signal determination. In addition, the present invention also provides a new technique for removing one or more out-of-class hydrocyclones before an average is taken, that would greatly enhance the performance of the known average signal generation method set forth above.

Particular Embodiments

In its broadest sense, the present invention may include, or take the form of, a technique for tracking the particle size of a slurry, e.g., that is passing through a pipe in a hydrocyclone battery in a mineral extraction processing system, including extracting a mineral from ore, and for providing control signaling for operating the hydrocyclone battery based upon the same.

According to some embodiments of the present invention, the technique may include, or take the form of, a controller, e.g. for controlling a slurry flowing from incoming piping and entering hydrocyclones arranged in a battery configuration, featuring a signal processor configured at least to:

receive signaling containing information about respective individual cyclone control signaling x(i) for each individual cyclone being evaluated and controlled, median control signaling $\tilde{x}$ of all of the respective individual cyclone control signaling x(i), a scale factor $A_i$ and a number N of the individual cyclones being evaluated and controlled; and determine primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling x(i) and the median control signaling $\tilde{x}$, applying the scaling factor $A_i$ to each respective difference, and normalizing the sum by the number N of the individual cyclones being evaluated and controlled, based upon the signaling received.

The present invention may also include one or more of the following features:

The signal processor may be configured to determine the primary control signaling C using the following equation:

$$C = \tilde{x} + \frac{\Sigma_N (x(i) - \tilde{x}) * A_i}{N}. \quad \text{(Equation 1)}$$

The correction factor may takes the form of the equation:

$$\tilde{x} + \frac{\Sigma_N (x(i) - \tilde{x}) * A_i}{N}.$$

The signal processor may be configured to provide the primary control signaling C to control the flow rate and pressure of the slurry flowing from incoming piping and entering hydrocyclones, e.g., using a flow rate and pressure regulator.

The respective individual cyclone control signaling x(i) may contain information about the particle size P(i) of particles passing through each of the individual cyclones being evaluated and controlled.

The respective individual cyclone control signaling x(i) may be generated by individual cyclone sensors arranged on, or in relation to, each of the individual cyclones being evaluated and controlled.

The individual cyclone sensors may be arranged on individual overflows of the individual cyclones being evaluated and controlled.

The signal processor may be configured to remove the respective individual cyclone control signaling x(i) received from one or more out-of-class hydrocyclones in the battery configuration, and determine the primary control signaling C to control the slurry flowing from the incoming piping and entering the hydrocyclones arranged in the battery configuration based upon this removal.

The signal processor may be configured to remove all out-of-class hydrocyclones that deviate from a predetermined median by a certain amount or a certain number of standard deviations away from the predetermined median before an average calculation is performed.

The signal processor may be configured to remove any out-of-class hydrocyclone where the respective difference of each of the respective individual cyclone control signaling x(i) and the median control signaling $\tilde{x}$ deviates from a predetermined median by a certain amount or a certain number of standard deviations away from the predetermined median before an average calculation is performed.

The controller may form part of a particle size tracking (PST) system that is configured to give a particle size indication of the slurry that is passed from individual hydrocyclones in the battery configuration, including from one or more overflow pipes of the individual hydrocyclones.

The signal processor may be configured to combine the respective individual cyclone control signaling x(i) for each individual cyclone being evaluated and controlled into the primary control signaling C determined.

According to some embodiments, the present invention may take the form of a PST system, e.g., having a controller for controlling a slurry flowing from incoming piping and entering hydrocyclones arranged in a battery configuration. The PST system may include hydrocyclones arranged in a battery configuration having incoming pipe for passing a slurry to the hydrocyclones, and also having one or more overflow pipes for providing a processed slurry from the hydrocyclones, and may also include the controller having a signal processor configured to implement the signal processing functionality set forth above. The system may also include one or more other features, e.g., consistent with that set forth above.

According to some other embodiments, the present invention may take the form of a method for controlling a slurry flowing from incoming piping and entering hydrocyclones arranged in a battery configuration, featuring steps for receiving, with a signal processor, signaling containing information about respective individual cyclone control signaling x(i) for each individual cyclone being evaluated and controlled, median control signaling $\tilde{x}$ of all of the respective individual cyclone control signaling x(i), a scale factor $A_i$ and a number N of the individual cyclones being evaluated and controlled; and determining, with the signal processor, primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling x(i) and the median control signaling $\tilde{x}$, applying the scaling factor $A_i$ to each respective difference, and normalizing the sum by the number N of the individual cyclones being evaluated and controlled, based upon the signaling received.

The signal processor or signal processor module may include, or take the form of, a signal processor and at least one memory including a computer program code, where the signal processor and at least one memory are configured to cause the controller to implement the signal processing functionality of the present invention, e.g., to respond to signaling received and to determine the primary control signaling C, based upon the signaling received.

According to some embodiment, the present invention may take the form of apparatus comprising means for receiving signaling containing information about respective individual cyclone control signaling x(i) for each individual cyclone being evaluated and controlled, median control signaling $\tilde{x}$ of all of the respective individual cyclone control signaling x(i), a scale factor $A_i$ and a number N of the individual cyclones being evaluated and controlled; and means for determining primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling x(i) and the median control signaling $\tilde{x}$, applying the scaling factor $A_i$ to each respective difference, and normalizing the sum by the number N of the individual cyclones being evaluated and controlled, based upon the signaling received, consistent with that set forth herein.

According to some embodiments, the present invention may also take the form of a computer-readable storage medium having computer-executable components for performing the steps of the aforementioned method. The computer-readable storage medium may also include one or more of the features set forth above.

One advantage of the present invention is that it provides a better way both for tracking particle size of a slurry, e.g., that is passing through a pipe in a hydrocyclone battery in a mineral extraction processing system, including extracting a mineral from ore, and for providing control signaling for operating the hydrocyclone battery based upon the same.

BRIEF DESCRIPTION OF THE DRAWING

The drawing includes FIGS. 1-5, which are not necessarily drawn to scale, as follows:

FIG. 3 is a block diagram of a controller having a signal processor for implementing signal processing control functionality, according to some embodiments of the present invention.

DETAILED DESCRIPTION OF BEST MODE OF THE INVENTION

Summary of Basic Invention

In summary, the present invention provides a primary control signal generation method that gives limited weight to outlier hydrocyclones while still providing a stable control signal. The equation for the generation of this control signal is given below:

$$C = \tilde{x} + \frac{\Sigma_N (x(i) - \tilde{x}) * A_i}{N}. \qquad \text{(Equation 1)}$$

The control signal C is given in Equation 1, where x(i) is the individual hydrocyclone signal, $\tilde{x}$ is the median of all the N hydrocyclones, and $A_i$ is a scale factor. Essentially, this equation takes the median and adds a correction factor to it that is based on the sum of the differences of each individual hydrocyclone with the median and with a scale factor applied to each. It is then normalized by the number N of hydrocyclones that are evaluated. This uses the benefit of the outlier rejection of the base median signal, but adds in a correction that is biased by the deviation of each hydrocyclones signal from the median in a controlled manner. This results in adding in some limited contribution from the non-median signals and reducing the potential noise on the median signal.

Figure 1:
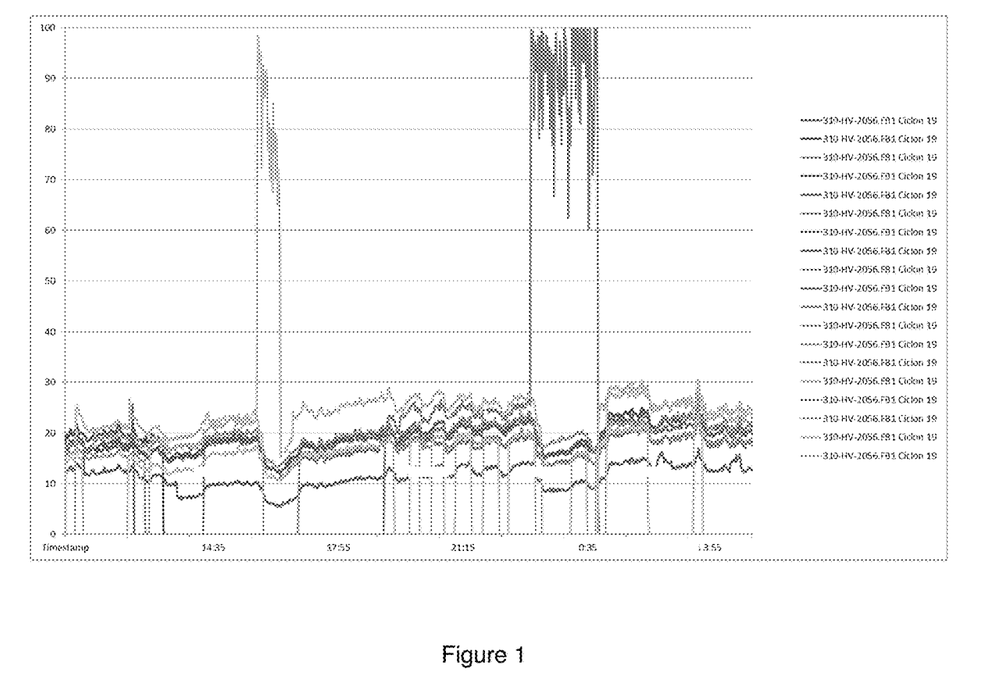
FIG. 1 shows a graph of raw hydrocyclone outputs, e.g., having 19 outputs, even though about half of the hydrocyclones may be ON at any given point.
Figure 2:
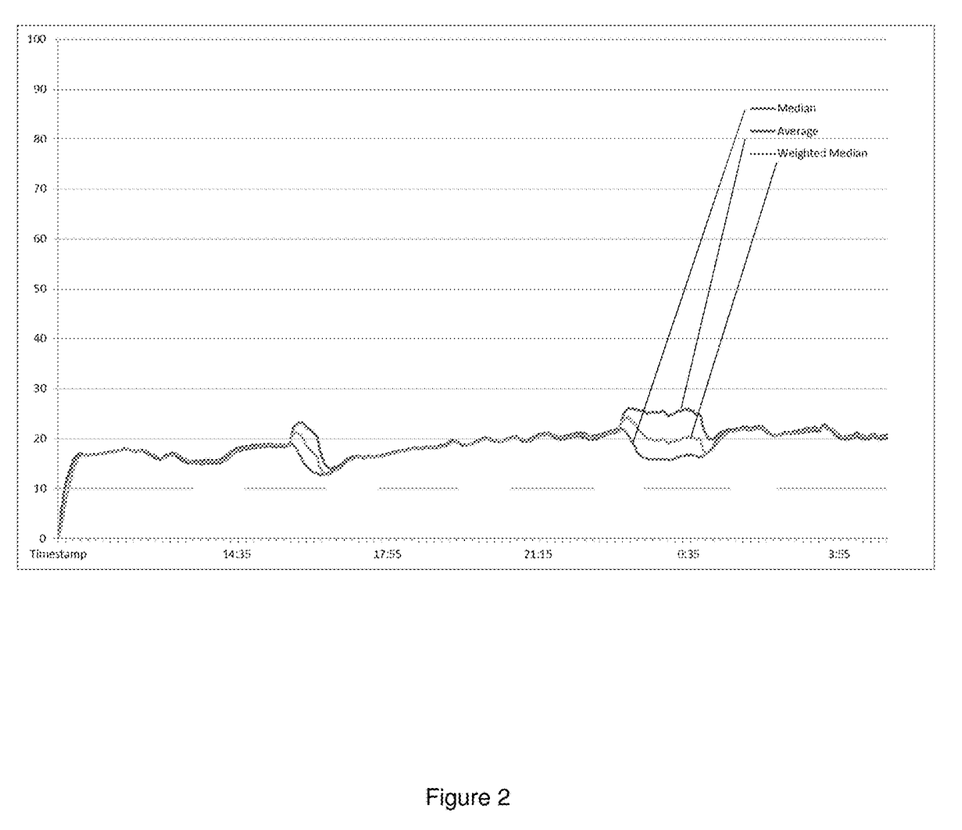
FIG. 2 shows a graph of control signals using various techniques, e.g., including the prior art average and median techniques, as well as weighted median technique according to some embodiments of the present invention.

FIGS. 1 and 2 show an example case that demonstrate the performance of this technique.

For example, FIG. 1 shows the raw hydrocyclones output. There are 19 hydrocyclones however only about half of them are typically ON at any point, and they switch around. In FIG. 2, out-of-class events are seen, one approximately ⅓ of the way into the plot (e.g., between t(14:35) and t(17:55)), the other at about at the ¾ mark (e.g., at about t(0:35)). FIG. 2 shows the control signals using the various techniques discussed, namely: the average, median and weighted median. It is interesting to note how the median and average deviate in different ways from the middle of the hydrocyclones signals during the out-of-class events. The behavior of the weighted mean is seen during these out-of-class events as well as during the typical running conditions. As would be expected during normal operating conditions, all three methods produce very similar control signals.

An alternative approach that may also be utilized, particularly with the average control scheme, is to remove one or more of the out-of-class hydrocyclones from the control signal calculation. An optimum control signal generation strategy would remove the hydrocyclones that deviate from the median by a certain amount or a certain number of standard deviations away from the median before the average calculation is performed. This removal would result in preventing the average signal from being significantly biased by the out-of-class hydrocyclones and give a more representative control signal.

The following is a discussion of specific examples or implementations, according to some embodiments of the present invention.

FIG. 3

By way of example, FIG. 3 shows a controller generally indicated as 10, e.g. having at least one signal processor 12 for implementing the signal processing functionality according to some embodiments of the present invention. In operation, the at least one signal processor 12 may be configured to:

receive signaling containing information about respective individual cyclone control signaling x(i) for each individual cyclone being evaluated and controlled, median control signaling $\tilde{x}$ of all of the respective individual cyclone control signaling x(i), a scale factor $A_i$ and a number N of the individual cyclones being evaluated and controlled; and determine primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling x(i) and the median control signaling $\tilde{x}$, applying the scaling factor $A_i$ to each respective difference, and normalizing the sum by the number N of the individual cyclones being evaluated and controlled, based upon the signaling received.

By way of example, the signal processor 12 may be configured to determine the primary control signaling C using the following equation:

$$C = \tilde{x} + \frac{\Sigma_N (x(i) - \tilde{x}) * A_i}{N}. \quad \text{(Equation 1)}$$

By way of further example, the signal processor may be configured to provide the primary control signaling C to control the flow rate and pressure of the slurry flowing from incoming piping and entering hydrocyclones.

By way of still further example, the correction factor may takes the form of the equation:

$$\tilde{x} + \frac{\Sigma_N (x(i) - \tilde{x}) * A_i}{N}.$$

By way of still further example, the signaling received may include respective individual cyclone control signaling x(i) for each individual cyclone being evaluated and controlled, e.g., that may be received from one or more individual cyclone sensors 40 (FIG. 5) arranged on each of the one or more of the individual cyclones being evaluated and controlled. By way of further example, the signaling received may also include the median control signaling $\tilde{x}$ of all of the respective individual cyclone control signaling x(i), the scale factor $A_i$ and the number N of the individual cyclones being evaluated and controlled, e.g., that may be stored in, and received from, a memory module in which this information may be retrieved, e.g., which may form part of the other signal processor circuits or components 14 (FIG. 3).

The at least one signal processor 12 may also be configured to determine the primary control signaling C containing information to control the slurry flowing from the incoming piping 32 (FIG. 5) and entering the hydrocyclones 34 (FIG. 5) arranged in the battery configuration, based upon the signaling received. A person skilled in the art would appreciate and understanding without undue experimentation, especially after reading the instant patent application together with that known in the art, e.g., how to implement suitable signaling processing functionality to make one or more such determinations.

Figure 5:
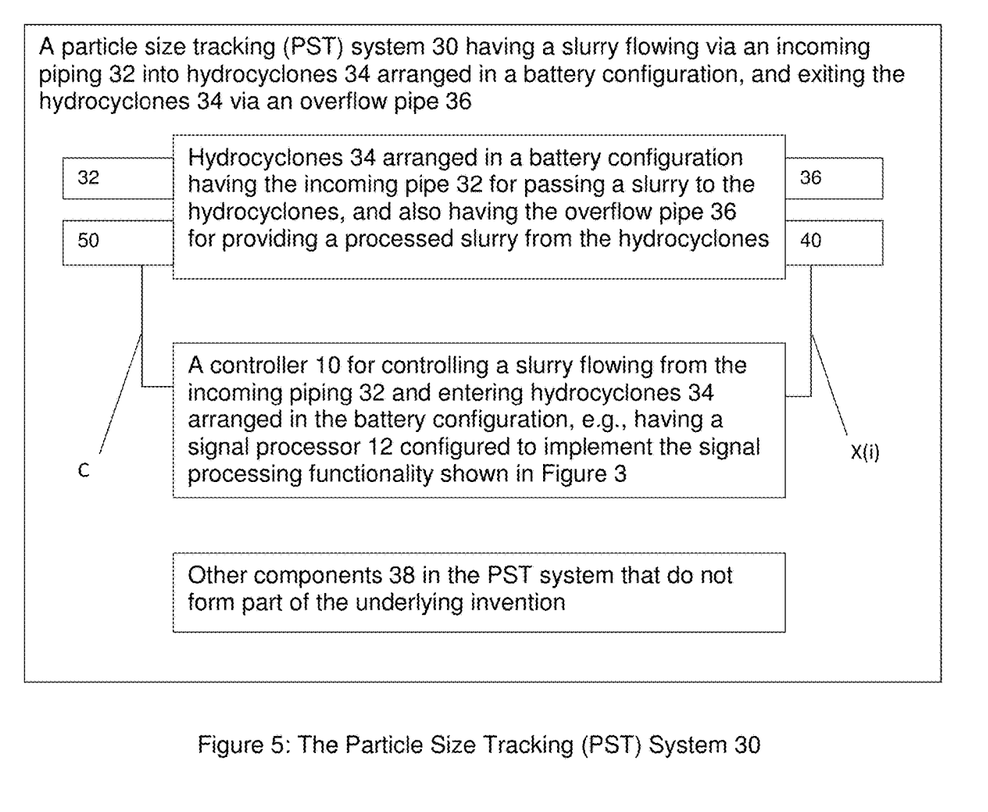
FIG. 5 is a block diagram of a particle size tracking system having hydrocyclones and a controller having a signal processor for implementing signal processing functionality to control the operation of the hydrocyclones, according to some embodiments of the present invention.

The signal processor 12 may be configured to provide the primary control signaling C, e.g., to a flow rate and pressure regulator 50 (FIG. 5). By way of example, the primary control signaling C provided may contain information to control the slurry flowing from the incoming piping and entering the hydrocyclones 34 (FIG. 5) arranged in the battery configuration.

The functionality of the signal processor or processor module 12 may be implemented using hardware, software, firmware, or a combination thereof. In a typical software implementation, the processor module may include one or more microprocessor-based architectures having a microprocessor, a random access memory (RAM), a read only memory (ROM), input/output devices and control, data and address buses connecting the same, e.g., consistent with that shown in FIG. 3, e.g., see element 14. A person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the controller 10 may also include, e.g., other signal processor circuits or components 14 that do not form part of the underlying invention, e.g., including input/output modules, one or more memory modules, data, address and control busing architecture, etc. In operation, the at least one signal processor 12 may cooperation and exchange suitable data, address and control signaling with the other signal processor circuits or components 14 in order to implement the signal processing functionality according to the present invention. By way of example, the signaling may be received by such an input module, provided along such a data bus and stored in such a memory module for later processing, e.g., by the at least one signal processor 12. After such later processing, processed signaling resulting from any such determination may be stored in such a memory module, provided from such a memory module along such a data bus to such an output module, then provided from such an output module as the primary control C, e.g., by the at least one signal processor 12.

According to at least some embodiments of the present invention, and consistent with that set forth herein, it is also noted that the respective difference of each of the respective individual cyclone control signaling x(i) and the median control signaling $\tilde{x}$ may include, or may take the form of, or may be understood to be, an absolute difference, as a person skilled in the art would appreciate.

Figure 4:
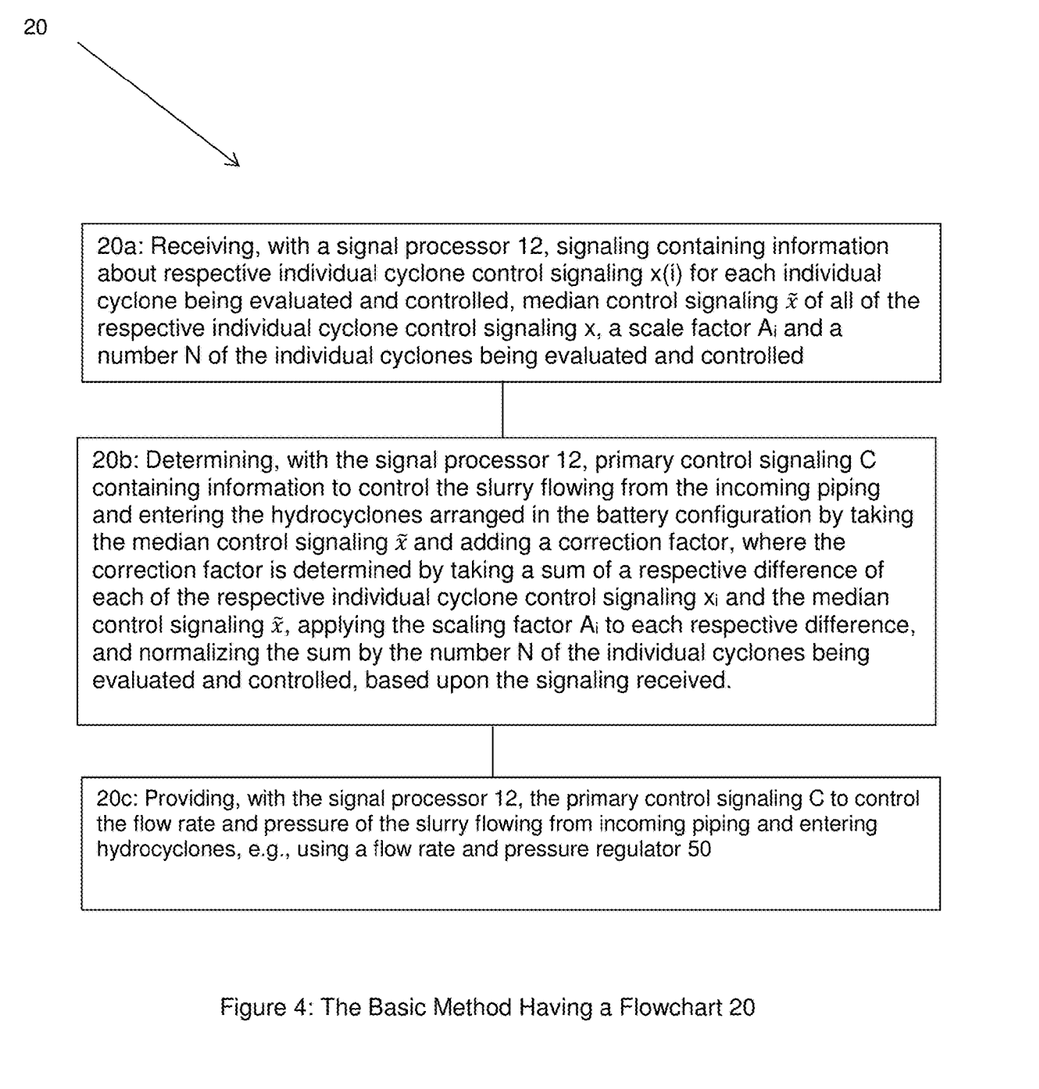
FIG. 4 is a flowchart of a method having steps for implementing signal processing functionality with a signal processor, according to some embodiments of the present invention.

FIG. 4

FIG. 4 shows a method generally indicated as 20 having steps 20a, 20b and 20c for implementing the signal processing functionality or algorithm, e.g., with at least one signal processor like element 12 in FIG. 3, according to some embodiments of the present invention.

The method 20 may include a step 20a for receiving, with a signal processor like element 12, signaling containing information about respective individual cyclone control signaling x(i) for each individual cyclone being evaluated and controlled, median control signaling $\tilde{x}$ of all of the respective individual cyclone control signaling x(i), a scale factor $A_i$ and a number N of the individual cyclones being evaluated and controlled, e.g., consistent with that set forth herein.

The method 20 may include a step 20b for determining, with the signal processor 12, primary control signaling C containing information to control the slurry flowing from the incoming piping 32 (FIG. 5) and entering the hydrocyclones 34 (FIG. 5) arranged in the battery configuration by taking the median control signaling $\tilde{x}$ and adding a correction factor, where the correction factor is determined by taking a sum of a respective difference of each of the respective individual cyclone control signaling x(i) and the median control signaling x̃, applying the scaling factor $A_i$ to each respective difference, and normalizing the sum by the number N of the individual cyclones being evaluated and controlled, based upon the signaling received.

The method 20 may also include a step 20c for providing, with the signal processor 12, the primary control signaling C to control the flow rate and pressure of the slurry flowing from incoming piping and entering hydrocyclones, e.g., using the flow rate and pressure regulator 50 (FIG. 5)

The method may also include one or more steps for implementing other features of the present invention set forth herein, including steps for making the various determinations associated with one or more statistical algorithms or techniques, e.g., consistent with that set forth herein.

FIG. 5: The PST System 30

FIG. 5 shows a particle size tracking (PST) system generally indicated as 30 having a slurry flowing via the incoming piping 32 into the hydrocyclones 34 arranged in the battery configuration, and exiting the hydrocyclones 34 via one or more overflow pipes 36. The hydrocyclones 34 are arranged in a battery configuration having the one or more incoming pipes 32 for passing the slurry to the hydrocyclones 34, and also having the one or more overflow pipes 36 for providing a processed slurry from the hydrocyclones 34. The PST system 30 may include one or more individual cyclone sensors 40 arranged on each of the one or more individual cyclones in the hydrocyclone 34 being evaluated and controlled. In operation, the respective individual cyclone control signaling x(i) may contain information about the particle size P(i) of particles passing through each of the individual cyclones being evaluated and controlled; and the respective individual cyclone control signaling x(i) may be generated by the individual cyclone sensors 40 arranged on each of the individual cyclones being evaluated and controlled. The PST system 30 may also include the flow rate and pressure regulator 50 that responds to the primary control signaling C provided by the controller 10, and controls the slurry flowing from the incoming piping 32 and entering the hydrocyclones 34 arranged in the battery configuration, e.g., by regulating the flow rate and pressure the slurry flowing from the incoming piping 32.

The PST system 30 also includes the controller 10 (see also FIG. 3) having the signal processor 12 for implementing signal processing control functionality to control the operation of the hydrocyclones, according to some embodiments of the present invention. In operation, the controller 10 is configured for controlling the slurry flowing from the incoming piping 32 and entering the hydrocyclones 34 arranged in the battery configuration, e.g., having the signal processor 12 configured to implement the signal processing functionality shown in FIG. 3.

The PST system 30 also includes other components 38 in the PST system that do not form part of the underlying invention, e.g., which would be understood and appreciate by a person skilled in the art.

Hydrocyclones like element 34, cyclone sensors like element 40 and flow rate and pressure regulators like element 50 are known in the art, and the scope of the invention is not intended to be limited to any particular type or kind thereof, e.g., either now known or later developed in the future. By way of example, see the assignee's family of related hydrocyclone-related patent applications set forth above, as well as assignee's hydrocyclone products and patents set forth below.

The Assignee's Hydrocyclone Products and Patents

By way of example, the assignee of the instant patent application has developed hydrocyclone products, which are disclosed in one or more of the following granted U.S. Pat. Nos. 6,354,147; 6,435,030; 6,587,798; 6,601,458; 6,609,069; 6,691,584; 6,732,575; 6,813,962; 6,862,920; 6,889,562; 6,988,411; 7,032,432; 7,058,549; 7,062,976; 7,086,278; 7,110,893; 7,121,152; 7,127,360; 7,134,320; 7,139,667; 7,146,864; 7,150,202; 7,152,003; 7,152,460; 7,165,464; 7,275,421; 7,359,803; 7,363,800; 7,367,240; 7,343,820; 7,437,946; 7,529,966; and 7,657,392, which are all incorporated by reference in their entirety. The disclosure herein related to the present invention is intended to be interpreted consistent with the family of technologies disclosed in all the issued patents incorporated by reference herein.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A controller for controlling a slurry flowing from incoming piping and entering hydrocyclones arranged in a battery configuration, comprising:
   a signal processor configured to
      receive signaling containing information about respective individual cyclone control signaling x(i) for each individual cyclone being evaluated and controlled, median control signaling x̃ of all of the respective individual cyclone control signaling x(i), a scale factor $A_i$ and a number N of the individual cyclones being evaluated and controlled; and
      determine primary control signaling C containing information to control the slurry flowing from the incoming piping and entering the hydrocyclones arranged in the battery configuration by taking the median control signaling x̃ and adding a correction factor, where the correction factor is determined by taking a sum of a respective difference of each of the respective individual cyclone control signaling x(i) and the median control signaling x̃, applying the scaling factor $A_i$ to each respective difference, and normalizing the sum by the number N of the individual cyclones being evaluated and controlled, based upon the signaling received.

2. A controller according to claim 1, wherein the signal processor is configured to determine the primary control signaling C using the following equation:

$$C = \tilde{x} + \frac{\Sigma_N (x(i) - \tilde{x}) * A_i}{N}. \quad \text{(Equation 1)}$$

3. A controller according to claim 1, wherein the signal processor is configured to provide the primary control signaling C to control the flow rate and pressure of the slurry flowing from incoming piping and entering hydrocyclones.

4. A controller according to claim 1, wherein the correction factor may takes the form of the equation:

$$\tilde{x} + \frac{\Sigma_N (x(i) - \tilde{x}) * A_i}{N}.$$

5. A controller according to claim 1, wherein the respective individual cyclone control signaling x(i) contains information about the particle size P(i) of particles passing through each of the individual cyclones being evaluated and controlled; and
the respective individual cyclone control signaling x(i) are generated by individual cyclone sensors arranged on each of the individual cyclones being evaluated and controlled.

6. A controller according to claim 5, wherein the individual cyclone sensors are arranged on individual overflows of the individual cyclones being evaluated and controlled.

7. A controller according to claim 1, wherein the signal processor is configured to remove the respective individual cyclone control signaling x(i) received from one or more out-of-class hydrocyclones in the battery configuration, and determine the primary control signaling C to control the slurry flowing from the incoming piping and entering the hydrocyclones arranged in the battery configuration based upon this removal.

8. A controller according to claim 7, wherein the signal processor is configured to remove all out-of-class hydrocyclones that deviate from a predetermined median by a certain amount or a certain number of standard deviations away from the predetermined median before an average calculation is performed.

9. A controller according to claim 7, wherein the signal processor is configured to remove any out-of-class hydrocyclone where the respective difference of each of the respective individual cyclone control signaling x(i) and the median control signaling $\tilde{x}$ deviates from a predetermined median by a certain amount or a certain number of standard deviations away from the predetermined median before an average calculation is performed.

10. A controller according to claim 1, wherein the controller forms part of a particle size tracking (PST) system that is configured to give a particle size indication of the slurry that is passed from individual hydrocyclones in the battery configuration, including from one or more overflow pipes of the individual hydrocyclones.

11. A controller according to claim 1, wherein the signal processor is configured to combine the respective individual cyclone control signaling x(i) for each individual cyclone being evaluated and controlled into the primary control signaling C determined.

12. A particle size tracking (PST) system for controlling a slurry flowing from incoming piping and entering hydrocyclones arranged in a battery configuration, comprising:
hydrocyclones arranged in a battery configuration having an incoming pipe for passing a slurry to the hydrocyclones, and also having one or more overflow pipes for providing a processed slurry from the hydrocyclones; and
a controller having a signal processor configured to
receive signaling containing information about respective individual cyclone control signaling x(i) for each individual cyclone in the hydrocyclones arranged in the battery configuration being evaluated and controlled, median control signaling $\tilde{x}$ of all of the respective individual cyclone control signaling x(i), a scale factor $A_i$ and a number N of the individual cyclones being evaluated and controlled; and
determine primary control signaling C containing information to control the slurry flowing from the incoming piping and entering the hydrocyclones arranged in the battery configuration by taking the median control signaling $\tilde{x}$ and adding a correction factor, where the correction factor is determined by taking a sum of a respective difference of each of the respective individual cyclone control signaling X(i) and the median control signaling $\tilde{x}$, applying the scaling factor $A_i$ to each respective difference, and normalizing the sum by the number N of the individual cyclones being evaluated and controlled, based upon the signaling received.

13. A PST system according to claim 12, wherein the signal processor is configured to determine the primary control signaling C using the following equation:

$$C = \tilde{x} + \frac{\Sigma_N (x(i) - \tilde{x}) * A_i}{N}. \quad \text{(Equation 1)}$$

14. A PST system according to claim 12, wherein the signal processor is configured to provide the primary control signaling C to control the flow rate and pressure of the slurry flowing from incoming piping and entering hydrocyclones.

15. A PST system according to claim 12, wherein the correction factor may takes the form of the equation:

$$\tilde{x} + \frac{\Sigma_N (x(i) - \tilde{x}) * A_i}{N}.$$

16. A PST system according to claim 12, wherein the respective individual cyclone control signaling x(i) contains information about the particle size P(i) of particles passing through each of the individual cyclones being evaluated and controlled; and the respective individual cyclone control signaling x(i) are generated by individual cyclone sensors arranged on each of the individual cyclones being evaluated and controlled.

17. A PST system according to claim 16, wherein the individual cyclone sensors are arranged on individual overflows of the individual cyclones being evaluated and controlled.

18. A PST system according to claim 12, wherein the signal processor is configured to remove the respective individual cyclone control signaling x(i) received from one or more out-of-class hydrocyclones in the battery configuration, and determine the primary control signaling C to control the slurry flowing from the incoming piping and entering the hydrocyclones arranged in the battery configuration based upon this removal.

19. A PST system according to claim 18, wherein the signal processor is configured to remove all out-of-class hydrocyclones that deviate from a predetermined median by a certain amount or a certain number of standard deviations away from the predetermined median before an average calculation is performed.

20. A PST system according to claim 18, wherein the signal processor is configured to remove any out-of-class hydrocyclone where the respective difference of each of the respective individual cyclone control signaling x(i) and the median control signaling x̃ deviates from a predetermined median by a certain amount or a certain number of standard deviations away from the predetermined median before an average calculation is performed.

21. A PST system according to claim 12, wherein the controller forms part of a particle size tracking (PST) system having that is configured to give a particle size indication of the slurry that is passed from individual hydrocyclones in the battery configuration, including from one or more overflow pipes of the individual hydrocyclones.

22. A PST system according to claim 12, wherein the signal processor is configured to combine the respective individual cyclone control signaling x(i) for each individual cyclone being evaluated and controlled into the primary control signaling C determined.

23. A method for controlling a slurry flowing from incoming piping and entering hydrocyclones arranged in a battery configuration, comprising:
receiving, with a signal processor, signaling containing information about respective individual cyclone control signaling x(i) for each individual cyclone being evaluated and controlled, median control signaling x̃ of all of the respective individual cyclone control signaling x(i), a scale factor $A_i$ and a number N of the individual cyclones being evaluated and controlled; and
determining, with the signal processor, primary control signaling C containing information to control the slurry flowing from the incoming piping and entering the hydrocyclones arranged in the battery configuration by taking the median control signaling x̃ and adding a correction factor, where the correction factor is determined by taking a sum of a respective difference of each of the respective individual cyclone control signaling x(i) and the median control signaling x̃, applying the scaling factor $A_i$ to each respective difference, and normalizing the sum by the number N of the individual cyclones being evaluated and controlled, based upon the signaling received.

24. A method according to claim 23, wherein the method comprises determining with the signal processor the primary control signaling C using the following equation:

$$C = \tilde{x} + \frac{\Sigma_N (x(i) - \tilde{x}) * A_i}{N}. \quad \text{(Equation 1)}$$

25. A method according to claim 23, wherein the method comprises providing with the signal processor the primary control signaling C to control the flow rate and pressure of the slurry flowing from incoming piping and entering hydrocyclones.

26. A method according to claim 23, wherein the correction factor may takes the form of the equation:

$$\tilde{x} + \frac{\Sigma_N (x(i) - \tilde{x}) * A_i}{N}.$$

27. A method according to claim 23, wherein the respective individual cyclone control signaling x(i) contains information about the particle size P(i) of particles passing through each of the individual cyclones being evaluated and controlled; and the method comprises generating the respective individual cyclone control signaling x(i) by individual cyclone sensors arranged on each of the individual cyclones being evaluated and controlled.

28. A method according to claim 27, wherein the method comprises arranging the individual cyclone sensors on individual overflows of the individual cyclones being evaluated and controlled.

29. A method according to claim 23, wherein the method comprises removing with the signal processor the respective individual cyclone control signaling x(i) received from one or more out-of-class hydrocyclones in the battery configuration, and determine the primary control signaling C to control the slurry flowing from the incoming piping and entering the hydrocyclones arranged in the battery configuration based upon this removal.

30. A method according to claim 29, wherein the method comprises removing with the signal processor all out-of-class hydrocyclones that deviate from a predetermined median by a certain amount or a certain number of standard deviations away from the predetermined median before an average calculation is performed.

31. A method according to claim 29, wherein the method comprises removing with the signal processor any out-of-class hydrocyclone where the respective difference of each of the respective individual cyclone control signaling x(i) and the median control signaling x̃ deviates from a predetermined median by a certain amount or a certain number of standard deviations away from the predetermined median before an average calculation is performed.

32. A method according to claim 23, wherein the method comprises forming the controller as part of a particle size tracking (PST) system having that is configured to give a particle size indication of the slurry that is passed from individual hydrocyclones in the battery configuration, including from one or more overflow pipes of the individual hydrocyclones.

33. A method according to claim 23, wherein the method comprises combining with the signal processor the respective individual cyclone control signaling x(i) for each individual cyclone being evaluated and controlled into the primary control signaling C determined.

34. Apparatus comprising
means for receiving signaling containing information about respective individual cyclone control signaling x(i) for each individual cyclone being evaluated and controlled, median control signaling x̃ of all of the respective individual cyclone control signaling x(i), a scale factor $A_i$ and a number N of the individual cyclones being evaluated and controlled; and
means for determining primary control signaling C containing information to control the slurry flowing from the incoming piping and entering the hydrocyclones arranged in the battery configuration by taking the median control signaling x̃ and adding a correction factor, where the correction factor is determined by taking a sum of a respective difference of each of the respective individual cyclone control signaling x(i) and the median control signaling x̃, applying the scaling factor $A_i$ to each respective difference, and normalizing the sum by the number N of the individual cyclones being evaluated and controlled, based upon the signaling received, consistent with that set forth herein.

* * * * *